Figures 1, 2, 3:
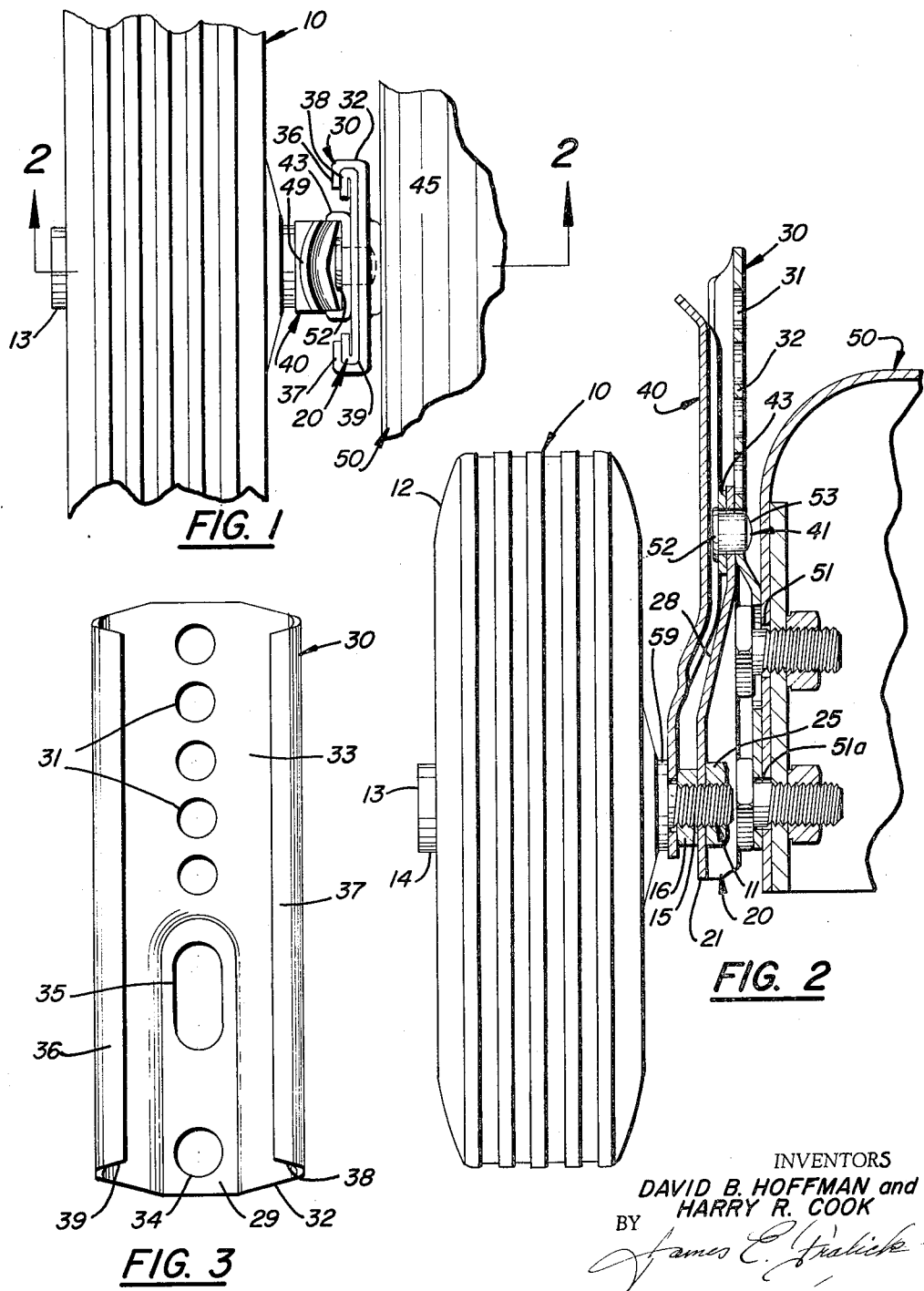

Oct. 5, 1965  D. B. HOFFMAN ETAL  3,210,089
VARIABLE WHEEL SUSPENSION
Filed July 16, 1962  2 Sheets-Sheet 1

INVENTORS
DAVID B. HOFFMAN and
HARRY R. COOK
BY
ATTORNEY

United States Patent Office 3,210,089
Patented Oct. 5, 1965

3,210,089
VARIABLE WHEEL SUSPENSION
David B. Hoffman and Harry R. Cook, Upper Arlington, Ohio, assignors, by mesne assignments, to Pull-R-Hoist Company, a corporation of Ohio
Filed July 16, 1962, Ser. No. 209,837
7 Claims. (Cl. 280—43)

The invention which is disclosed herein and illustrated in the appended drawings relates generally to devices for releasably securing wheels to vehicles. More specifically, this invention relates to a device for gauging the height of the underbody, of a wheel-supported structure, above a supporting surface traversed by a wheel of such a structure.

For example, this invention may serve to position the cutting mechanism of a rotary type lawnmower at any of a variety of predetermined distances above the earth over which the mower is operated. The purposes of such devices is to afford the mower operator means for selecting a variety of uniform heights at which ahe mower cutting elements will sever the blades of grass in a lawn.

Other structures which are employed for this purpose necessitate the location of mower wheels so remote from the outer limits of the cutting swath, produced by the mower, that the machine is not capable of cutting grass in close proximity to obstructions, such as trees, curbs, foundations, retaining walls and flower beds.

A second distadvantage of previously known devices for this purpose is that two hands of the operator are required either to adjust the height regulating mechanism or to remove a wheel for servicing. Therefore other means must be employed simultaneously, in such a machine, for supporting the mower frame during height adjustment or wheel removal opeartions. Thus it is difficult for a single operator either to readjust such devices to a predetermined height position or to service a wheel or wheel suspension apparatus in such a machine.

Another unsatisfactory feature which is characteristic of other devices employed for this purpose is that height readjustment of the machine requires the manipulation of structural elements which are located dangerously near to unguarded cutting elements of the machine. Thus when the operator attempts to readjust the effective cutting height of a machine equipped with such devices, while the mower is running, he risks mutilation or painful injury to the hands which are employed in the manual readjustment operation.

Objects

One object of this invention is to provide a device for removably securing supporting wheels to a wheel-supported structure, whereby the use of only one hand is required for its operation.

A second object of the present invention is to provide a compact device for releasably securing wheels to a lawnmower, whereby the wheels are positioned in close lateral proximity to the cutting mechanism.

A further object of this invention is to provide a device for adjusting the height of a lawnmower above the ground, which may be maunally operated by the use of one hand.

Another object of the invention is to provide a manually operated device for adjusting the effective cutting height of a lawnmower, which may be adjusted without placing the hands of the operator in danger of being injured by the cutting elements of the mower.

Still further objects and features of this invention will be apparent from the subjoined specification and claims, when they are considered together with the attached drawings.

Drawings

Figure 4:
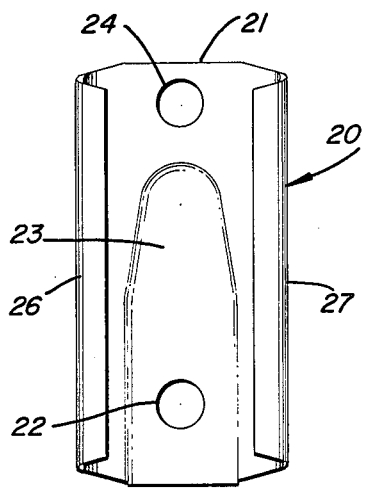
Figure 6:
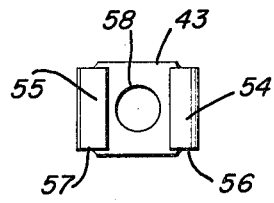
Figure 5:
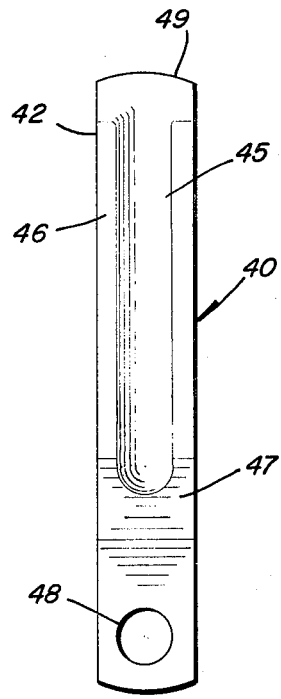
Figure 7:
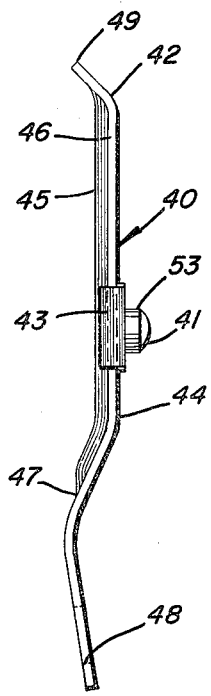

In the drawings which illustrate the invention:
FIG. 1 is a top view, showing the device of this invention in association with the frame of a lawnmower and a wheel.
FIG. 2 is a sectional view taken along line 2—2 of FIG. 1.
FIG. 3 is a plan view of the back plate.
FIG. 4 is a plan view of the slide plate.
FIG. 5 is a plan view of the latch spring.
FIG. 6 is a plan view of the latch pin clip.
FIG. 7 is a side view showing the latch pin secured to the latch spring by mean sof the latch spring clip.

Description

Briefly stated the structure of this inevntion is seen in FIGS. 1 and 2 as a readily adjustable device for releasably securing a wheel 10 to a wheel-supported vehicle 50 comprising, in combination: a first means 11 for journaling wheel 10; second means 20 for slideably connecting means 11 to vehicle 50; third means 30 for retaining means 20 in slideable engagement with vehicle 50; and fourth means 40, located intermediate wheel 10 and means 20, for releasably securing the connecting means 20 in predetermined vertical register with retaining means 30.

Referring more specifically to the drawings for a more detailed description of the device of this invention, it will be seen in FIG. 2 that journaling means 11 comprises a suitable spindle 13, formed with a hub 14 on its outer end and threads 15 adjacent its opposite end. Wheel 10 is journaled on spindle 13, adjacent hub 14. Hub 14 may be formed integrally with spindle 13, or if desired a suitable locking nut may be provided, together with cooperating threads adjacent the outer end of spindle 13.

Connecting means 20 comprises a slide plate 21, which is shown in the plan view of FIG. 4. Plate 21 is provided with a spindle bore 22, adjacent its lower end a pin bore 24 adjacent its upper end. A cavity 23 is formed in the lower portion of plate 21 for accommodating spindle nut 25. Suitable hems 26 and 27 may be provided if desired along opposite edges of plate 21 for reinforcing plate 21 against end to end stresses.

Connecting means 20 may be secured to spindle means 11 by any suitable device. In the form of this invention which is least expensive to manufacture, spindle 13 is contained within bore 22 (FIG. 4) of slide plate 21. spindle nut 25 (FIG. 2) serves to retain plate 21, as well as wheel 10 and other components described hereafter, mounted upon the spindle. Of course, if desired, bore 22 of plate 21 may be provided with suitable threads for cooperating with threads 15 of spindle 13 so as to secure plate 21 upon spindle 13. In either of these structural combinations, a locking nut 16 is provided on spindle 13, adjacent the outer face 28 of plate 21 to secure the spindle against rotational motion within bore 22 of plate 21.

As a third alternative for rigidly securing spindle 13 to plate 21, a suitable nut may be secured by welding or other well known means to plate 21, adjacent the spindle bore 22. Still other means for securing self-locking threaded devices to plate 21, adjacent bore 22 of plate 21 will be apparent to those skilled in the art.

Retaining means 30 comprises a back plate 32, formed with the general configuration shown in the plan view of FIG. 3 and the end view seen in FIG. 1 Concavity 29 is formed in the outer face 33 of plate 32 and extends longitudinally thereof adjacent the lower end. Openings 34 and 35 are located within cavity 33 of plate 32. Opening 35 is formed with the slotted configuration shown in FIG. 3. This serves to make openings 34 and 35 registerable with variously spaced pairs of mounting holes 51 and 51a which are ordinarily provided in the frame housing of rotary type lawnmowers now in common use.

Guides 36 and 37 (FIG. 3) are formed along the longitudinal edges of plate 32, defining oppositely disposed channels 38 and 39 (FIG. 1). A plurality of pin bores 31 are spaced in vertical alignment along the upper portion of plate 32. Back plate 32 is rigidly secured to the housing frame of a wheeled vehicle 50, such as a lawnmower for example, by suitable mounting bolts located in openings 34 and 35 of the back plate and mounting holes 51 and 51a of vehicle 50. The heads of the mounting bolts are secured against rotational movement, within openings 34 and 35, by the opposite walls of concavity 29.

Means 40 is provided for releasably securing connecting means 20 in any of a variety of predetermined positions of vertical registration with retaining means 30. Means 40 (FIG. 7) comprises, in combination; latch spring 42, pin 41; and means comprising a pin clip 43 for securing pin 41 upon the inwardly disposed surface 44 of spring 42.

Spring 42 is formed from a suitable resilient material with the general configuration shown in the plan view of FIG. 5 and the edge view of FIG. 7. A concavity 45 is formed in inner face 44 of spring 42 to make upper lever portion 46 of the spring less flexible than its lower portion 47. A suitable bore 48, for containing spindle 13 is provided near the lower end of spring 42. The flexible lower portion 47 of spring 42 is further formed with the substantially arcuate configuration seen in FIG. 7 Lever portion 46 of the spring terminates in an angularly disposed thumb tab 49 also shown in FIG. 7.

Pin 41 is formed generally as shown in FIG. 2, with an enlarged head 52 and a cylindrical body 53. Pin clip 43 is formed generally as shown in the plan view of FIG. 6 and the top view of FIG. 1. Guides 54 and 55 define oppositely disposed channels 56 and 57 for slideably receiving the opposite longitudinal edges of spring 42. A central bore 58 is provided for containing body portion 53 of pin 41, with a diameter less than that of head 52 of pin 41.

Means 40 is assembled by projecting body portion 53 of pin 41 through bore 58 of clip 43 (FIG. 1) with head portion 52 of pin 41 positioned between guides 54 and 55. Spring 42 is then slideably positioned within channels 56 and 57, formed by guides 54 and 55 of clip 43, with head portion 52 of pin 41 contained within cavity 45 of spring 42.

When the securing means 40 is thus assembled, it is mounted upon spindle 13 (FIG. 2) which is contained within bore 48 of spring 42. Means 40 is positioned, upon spindle 13, adjacent the outer face of locking nut 16 and may be spaced from the inner face of wheel 10 by a suitable spacing washer 59. Pin clip 43 is slideably repositioned along spring 42 until body 53 of pin 41 is in register with pin bore 24 of slide plate 21. Pin 41 is then projected through pin bore 24 and pin clip 43 is held against the outer face 28 of slide plate 21 by the normal bias of spring 42.

*Operation*

In operation, back plate 32 of the device of this invention may be secured to the frame of a wheel-supported vehicle by suitable bolts in the manner previously described and illustrated in FIG. 2. Of coure any structure which is the mechanical equivalent of that shown and described for back plate 32 may be formed integrally with the frame or housing of the vehicle without departing from the invention.

Thus it is seen that the portion of this device comprising wheel 10, spindle means 11, connecting means 20 and securing means 40 constitute a wheel suspension system which may be separate and distinct from a vehicle 50. A vehicle 50 is adapted by the installation of a back plate 32 (or its equivalent) for being supported by one or more of the readily detachable and adjustable wheel suspension systems which is provided by this invention.

The suspension system is attached to back plate 32 and vehicle 50 (FIG. 2) by first grasping the system between the thumb and fingers of one hand; with the thumb positioned upon the inner surface of tab 49 of spring 42, and the fingers of the same hand engaging the outer surface 12 of wheel 10. By the exertion of manual pressure upon these two points, the normal bias of spring 42, toward slide plate 21, is overcome. Further manual pressure of this nature operates to distort the lower portion 47 of spring 42, permitting the lever portion 46 of the spring to be flexibly rotated about portion 47 of lever 46 toward the inner surface of wheel 10. This operation serves to relocate pin 41 to a position outside of pin bore 24, since pin 41 is secured to upper portion 46 of spring 42 by clip 43.

With the wheel suspension system grasped between the thumb and fingers of one hand and pin 41 held intermediate slide plate 21 and wheel 10, in the manner just described; the opposite edges 26 and 27 of slide plate 21 are slideably positioned within channels 38 and 39 respectively of back plate 32 (FIG. 1), with the slide plate and back plate in face to face engagement. When pin 41 is thus removed from pin bore 24, and slide plate 21 is thus installed in back plate 32; it will be seen that the wheel suspension system is slideably connected to vehicle 50 and the suspension system may be selectively positioned with respect to back plate 32 and vehicle 50 at any of a variety of positions along the vertical axis of back plate 32.

When the desired height adjustment of vehicle 50 is thus achieved, the thumb pressure is removed from tab 49 of lever portion 46 of spring 42, permitting lever portion 46 to resume its normally biased position with clip 43 adjacent slide plate 21. Spring 42 carries with it pin 41 which is thus repositioned within bore 24 of slide plate 21. A slight further adjustment of the slide plate, upward or downward, within the end plate, will bring one of the locking bores 31 into registration with bore 24 and pin 41, whereupon the pin will be urged by flexible portion 47 of spring 42 into the selected locking bore, thus securing slide plate 21 and back plate 32 in a fixed relationship, and effectively locking the wheel suspension system against further vertical movement with respect to vehicle 50.

It is to be understood that the above embodiment of this invention is shown and described for purposes of illustration only. Various changes may be made therein without departing from the spirit and scope of the invention.

The invention claimed is:

1. A device for suspending a wheel from a vehicle which is supported thereby, comprising: a first means for journaling said wheel; a second means for connecting the journaling means to said vehicle; a third means for retaining the second means in slidable engagement with said vehicle; and a fourth means comprising a spring loaded lever secured to said journaling means, for releasably securing said connecting means in predetermined vertical register with said retaining means.

2. A device for gauging the height above the ground of a vehicle supported by a wheel comprising, in combination: means, comprising a spindle, for journaling said wheel; a slide plate, secured to one end of said spindle; a back plate, formed with a latch bore and secured to said vehicle; means, comprising a guide, for at times retaining said slide plate in face to face engagement with said vehicle; a lever, secured to said spindle and biased toward said slide plate; means, comprising a pin carried by said lever, for at times engaging said hatch bore.

3. A device for adjusting the height above the ground of a vehicle supported by a wheel comprising, in combination: a back plate, formed with a latching bore and secured to said vehicle; a slide plate, formed with a pin bore; means comprising a spindle secured to said slide plate, for rotatably mounting said wheel; means, comprising oppositely disposed guides, for at times retaining said slide plate in slidable engagement with said back plate; a lever, mounted upon said spindle means and biased toward said slide plate; means, comprising a pin, secured to said lever, for at times retaining said pin bore in registration with said latching bore.

4. A device for releasably securing a wheel suspension system to a vehicle comprising, in combination: a back plate, formed with a latching bore, and secured to said vehicle; a slide plate formed with a pin bore; a spindle secured to said slide plate; a wheel mounted upon said spindle; means, comprising oppositely disposed guides, for at times retaining said slide plate in slidable engagement with said back plate; a spring mounted lever secured to said spindle and biased toward said slide plate; means, comprising a pin carried by said lever for a times retaining said slide plate in fixed engagement with said back plate.

5. A device for releasably securing a wheel to a lawnmower comprising, in combination: a back plate, formed with a plurality of latching bores, and secured to said lawnmower; a slide plate formed with a pin bore; means, comprising a spindle secured to said slide plate, for rotatably mounting said wheel; means, comprising oppositely disposed guides, for at times retaining said slide plate in slideable engagement with said back plate; a leaf spring mounted upon said spindle intermediate said wheel and said slide plate, said spring being biased toward said slide plate; a lever carried by said spring; means, comprising a pin, carried by said lever for at times retaining said pin bore in registration with one of said latching bores; and means comprising a pin clip for mounting said pin upon said lever.

6. A device for adjustably securing a wheel to a lawnmower, comprising: a back plate, formed with a plurality of latching bores, and secured to the frame of said lawnmower; a slide plate formed with a pin bore; a spindle, secured to said slide plate; oppositely disposed guides, formed along the longitudinal edges of said back plate; a spring secured to said spindle, intermediate said wheel and said slide plate; a lever arm, connected to said spring and projecting upwardly therefrom, said arm being biased by said spring toward said slide plate; a concavity formed in said lever arm; a thumb tab formed at the upper terminus of said lever arm; a pin clip, carried in slideable engagement with said lever arm; a pin retained by said pin clip within said concavity of said lever arm, said pin being positionable along said lever arm in mutual registration with said pin bore and one of said latching bores.

7. A device for gauging the height above the ground of a lawnmower supported by a wheel, comprising: means, comprising a spindle, for journaling said wheel; a slide plate, secured to said spindle; a back plate, secured to said lawnmower; means, comprising a guide, for retaining said slide plate in engagement with said lawnmower; a spring, secured to said spindle and biased toward said slide plate; a lever, carried by said spring in face-to-face engagement with said slide plate; a pin, carried by said lever and repositionable therewith in registration with one of said latching bores; means, comprising a thumb tab, carried by said lever, for manual rotation of said lever, against the bias of said spring, to a position adjacent said wheel, wherein said pin is located outside of said latching bores.

References Cited by the Examiner

UNITED STATES PATENTS

| 2,586,724 | 2/52 | Sannebeck | 248—408 X |
| 2,879,074 | 3/59 | Robertson et al. | 280—43 |
| 3,043,604 | 7/62 | Rehnberg et al. | 280—43 |

FOREIGN PATENTS

| 972,062 | 5/59 | Germany. |

A. HARRY LEVY, *Primary Examiner.*

PHILIP ARNOLD, *Examiner.*